United States Patent
Wang

(10) Patent No.: US 12,479,428 B2
(45) Date of Patent: Nov. 25, 2025

(54) VEHICLE CONTROL DEVICE

(71) Applicant: TOYOTA JIDOSHA KABUSHIKI KAISHA, Toyota (JP)

(72) Inventor: Chenyu Wang, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 148 days.

(21) Appl. No.: 18/380,788

(22) Filed: Oct. 17, 2023

(65) Prior Publication Data

US 2024/0190427 A1   Jun. 13, 2024

(30) Foreign Application Priority Data

Dec. 8, 2022 (JP) ................................ 2022-196109

(51) Int. Cl.
*B60W 30/12* (2020.01)
*B60W 50/14* (2020.01)

(52) U.S. Cl.
CPC ............ *B60W 30/12* (2013.01); *B60W 50/14* (2013.01); *B60W 2420/403* (2013.01); *B60W 2552/50* (2020.02); *B60W 2554/20* (2020.02)

(58) Field of Classification Search
CPC .......... B60W 30/12; B60W 50/14; B60W 2420/403; B60W 2552/50; B60W 2554/20; G06V 20/58; G08B 21/18; G08G 1/0125; G08G 1/04; G08G 1/052; G08G 1/165; G08G 1/166; G08G 1/167
See application file for complete search history.

(56) References Cited

U.S. PATENT DOCUMENTS

| | | | |
|---|---|---|---|
| 6,647,139 B1* | 11/2003 | Kunii | G06F 18/2132 382/190 |
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,489,584 B2* | 11/2016 | Osanai | G08G 1/09626 |
| 9,714,034 B2 | 7/2017 | Otake et al. | |
| 9,880,558 B2 | 1/2018 | Nakamura | |
| 9,902,399 B2 | 2/2018 | Torii et al. | |

(Continued)

FOREIGN PATENT DOCUMENTS

| | | |
|---|---|---|
| JP | 2007-179386 A | 7/2007 |
| JP | 2014-159249 A | 9/2014 |

*Primary Examiner* — Kurt Philip Liethen
(74) *Attorney, Agent, or Firm* — Sughrue Mion, PLLC

(57) ABSTRACT

A vehicle control device recognizes a border of a traveling area of a vehicle based on image data acquired when a camera photographs a forward view of the vehicle, and performs at least one of a departure alarm and a departure control when the vehicle is predicted to depart from a reference line set based on the border or when the vehicle has departed from the border. Furthermore, the vehicle control device determines whether a particular registered three-dimensional object that is previously registered exists, based on the image data, and makes it easier to recognize the border in a predetermined easing area set based on the position of the registered three-dimensional object on the image data, than in a normal area on the image data other than the easing area, when it is determined that the registered three-dimensional object exists.

8 Claims, 4 Drawing Sheets

(56) References Cited

U.S. PATENT DOCUMENTS

| | | | |
|---|---|---|---|
| 10,345,443 B2 | 7/2019 | Masui et al. | |
| 10,611,240 B2 | 4/2020 | Masui et al. | |
| 10,795,374 B2* | 10/2020 | Kita | G05D 1/0234 |
| 11,370,420 B2* | 6/2022 | Yasui | B60W 30/0956 |
| 11,858,510 B2* | 1/2024 | Motegi | G06V 20/588 |
| 2009/0245626 A1* | 10/2009 | Norimatsu | G06V 10/25 |
| | | | 382/164 |
| 2011/0044503 A1* | 2/2011 | Sato | G06V 20/588 |
| | | | 382/103 |
| 2013/0272577 A1* | 10/2013 | Sakamoto | G06V 10/48 |
| | | | 382/103 |
| 2014/0133745 A1* | 5/2014 | Razavi | G06F 18/231 |
| | | | 382/160 |
| 2019/0050993 A1* | 2/2019 | Jang | G06V 10/82 |
| 2019/0279386 A1* | 9/2019 | Motohashi | G06V 20/56 |
| 2020/0019794 A1* | 1/2020 | Engelcke | G06N 3/08 |
| 2021/0291836 A1* | 9/2021 | Cho | B60W 30/18054 |
| 2021/0402996 A1* | 12/2021 | Wang | B60W 40/105 |
| 2022/0144304 A1* | 5/2022 | Ehsanibenafati | G06V 20/588 |

\* cited by examiner

VEHICLE CONTROL DEVICE

CROSS-REFERENCE TO RELATED APPLICATION

This application claims priority to Japanese Patent Application No. 2022-196109 filed on Dec. 8, 2022, incorporated herein by reference in its entirety.

BACKGROUND

1. Technical Field

The present disclosure relates to a vehicle control device that recognizes a border of a traveling area for a vehicle and that performs at least one of a departure alarm and a departure control when the vehicle departs from a reference line set based on the border.

2. Description of Related Art

Conventionally, a vehicle control device that performs at least one of a departure alarm and a departure control has been known. For example, a vehicle control device (referred to as "first conventional device", hereinafter) described in Japanese Unexamined Patent Application Publication No. 2014-159249 executes the departure control based on "a departure amount of a vehicle from a white line" and "a crossing angle between the vehicle and the while line".

Furthermore, a vehicle control device (referred to as "second conventional device", hereinafter) described in Japanese Unexamined Patent Application Publication No. 2007-179386 recognizes the white line using a Hough transform. More specifically, the second conventional device gives a larger weight to a vote value for the Hough transform in a lower area on image data acquired by a camera, than to that in an upper area on the image data. Thereby, even when noise is slightly extracted in the upper area on the image data, the recognition of the white line is properly performed when a proper white edge can be acquired in the lower area. The lower area on the image data is an area that is close to the vehicle, and the upper area on the image data is an area that is distant from the vehicle.

SUMMARY

In the second conventional device, there is a possibility that the vote value is equal to or more than "a recognition threshold for detecting the white line" only in the lower area on the image data, and therefore there is a possibility that the recognition accuracy for the white line is low in the upper area. Therefore, for example, in a situation where it is hard to recognize a white line distant from the vehicle, there is a possibility that the second conventional device cannot recognize the distant white line.

In this case, there is a high possibility that the second conventional device can recognize the unrecognizable white line only when the vehicle has got close to the white line. This is because the unrecognizable white line comes in the lower area on the image data when the vehicle has got close to the white line. In such a state, there is a high possibility that the vehicle control device such as the first conventional device executes the departure alarm or the departure control late.

The present disclosure has been made for dealing with the above problem. That is, an object of the present disclosure is to provide a vehicle control device that increases the possibility that the departure alarm or the departure control can be surely executed, by increasing the recognition accuracy for the border of the traveling area.

A vehicle control device (referred to as "present disclosure device", hereinafter) in the present disclosure includes:
 a camera (22) that photographs a forward view of a vehicle and that acquires image data; and
 a control unit (20) that recognizes a border (BL) of a traveling area for the vehicle based on the image data and that performs at least one of a departure alarm and a departure control (step 535) when an execution condition is satisfied, the execution condition being satisfied when the vehicle is predicted to depart from a reference line (Lth) that is set based on the border or when the vehicle has departed from the reference line, the departure alarm being relevant to the departure of the vehicle from the reference line, the departure control being a control to avoid the vehicle from departing from the reference line, in which
 the control unit is configured
 to determine whether a particular registered three-dimensional object exists, based on the image data, the registered three-dimensional object being previously registered (step 615), and
 to make it easier to recognize the border in a predetermined easing area (EA) than in a normal area (step 630), when the control unit determines that the registered three-dimensional object exists ("Yes" in step 615), the easing area being set based on the position of the registered three-dimensional object on the image data, the normal area being an area that is on the image data and that is other than the easing area.

With the present disclosure device, the easing area is set based on the position of the registered three-dimensional object on the image data. A three-dimensional object close to the border is registered as the registered three-dimensional object, and therefore, even in a situation where it is hard to recognize the border close to the registered three-dimensional object, it is possible to increase the possibility that the border can be recognized, even when the vehicle does not get close to the border (even when the vehicle is away from the border). Consequently, even when the vehicle is away from the border, it is possible to determine whether the execution condition is satisfied, and to increase the possibility that at least one of the departure alarm and the departure control can be surely executed. Accordingly, with the present disclosure device, it is possible to increase the possibility that the departure alarm or the departure control can be surely executed, by increasing the recognition accuracy for the border of the traveling area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
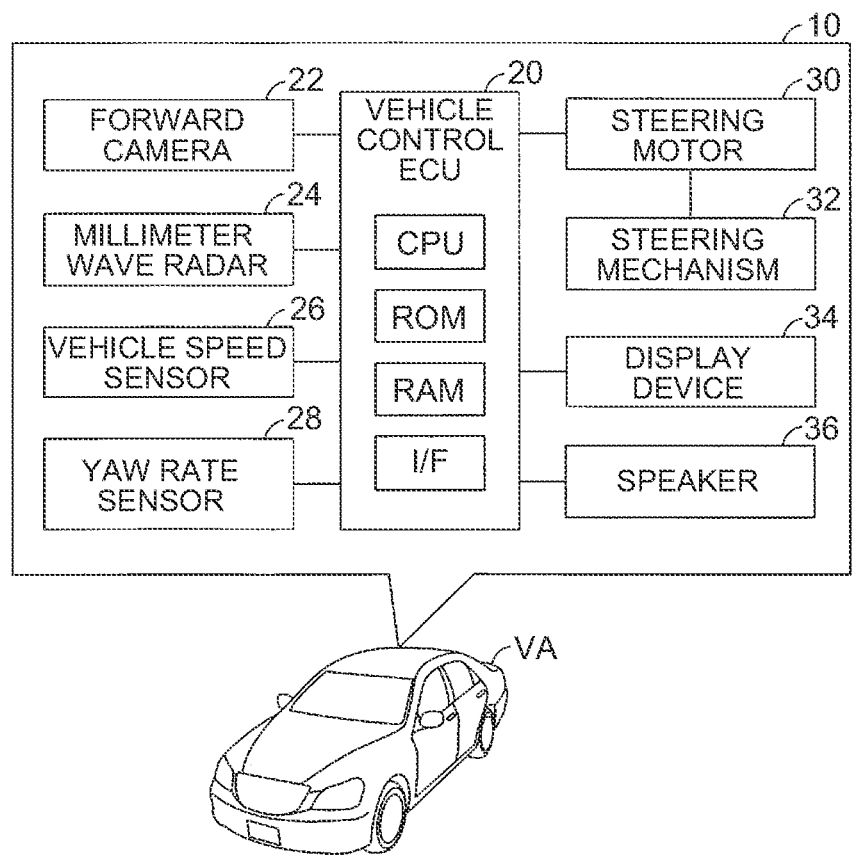
FIG. 1 is a schematic configuration diagram of a vehicle control device according to an embodiment of the present disclosure.

A vehicle control device (referred to as "present device 10", hereinafter) according to an embodiment is applied to a vehicle VA as shown in FIG. 1, and includes constituent elements shown in FIG. 1.

A vehicle control ECU 20 is an ECU that executes a later-described departure alarm and a later-described departure control that is a kind of autonomous driving, and is referred to as "ECU 20", hereinafter.

In the present specification, the "ECU" is an electronic control device that includes a microcomputer as a major part. The ECU is also referred to as a control unit, a controller, or a computer. The microcomputer includes a CPU (processor), a ROM, a RAM, an interface (I/F), and the like. The function of the ECU 20 may be realized by a plurality of ECUs.

A forward camera 22 acquires image data by photographing a forward view of the vehicle VA. The forward camera 22 sends the image data to the ECU 20.

A millimeter wave radar 24 acquires radar physical object information by sending a millimeter wave in the forward direction of the vehicle VA and receiving a reflected wave that is generated when the sent millimeter wave is reflected by a reflection point of a physical object. The radar physical object information includes "the position of the physical object relative to the vehicle VA" and "a relative velocity Vr of the physical object to the vehicle VA". The millimeter wave radar 24 sends the radar physical object information to the ECU 20.

A vehicle speed sensor 26 detects a vehicle speed Vs indicating the speed of the vehicle VA. A yaw rate sensor 28 detects a yaw rate Yr that acts on the vehicle VA. The ECU 20 acquires these detection values.

A steering motor 30 is built in a steering mechanism 32. The steering mechanism 32 is a mechanism for turning steering tire wheels in response to the operation of a steering wheel. The steering motor 30 causes the steering mechanism 32 to generate assist torque for assisting the operation of the steering wheel and causes the steering mechanism 32 to generate automatic steering torque for changing the turning angle of the steering tire wheels, in response to the instruction from the ECU 20.

A display device 34 displays a later-described departure alarm screen. A speaker 36 emits a later-described departure alarm sound.

The departure alarm and the departure control will be described below with reference to FIG. 2. The ECU 20 recognizes borders BL (a right border RB and a left border LB) of a traveling area TA where the vehicle VA travels, based on the image data. Examples of the border BL includes a white line, a guardrail, a curbstone and a wall on a road. The ECU 20 sets reference lines Lth (a right reference line RLth and a left reference line LLth) at positions that are a preset distance away from the borders BL in directions orthogonal to the borders BL.

When one of a condition 1 and condition 2 described below is satisfied, the ECU 20 determines that an execution condition is satisfied, and executes at least one of the departure alarm and the departure control.

Condition 1: A predicted route PR of the vehicle VA crosses the reference line Lth (that is, the vehicle VA is predicted to depart from the reference line Lth)

Condition 2: The vehicle VA has departed from the reference line Lth

The ECU 20 displays the departure alarm screen for alerting a driver to the departure of the vehicle VA from the reference line Lth, on the display device 34. The ECU 20 may emit the departure alarm sound for alerting the driver to the departure of the vehicle VA from the reference line Lth, from the speaker 36. The ECU 20 may concurrently perform the display of the departure alarm screen and the emission of the departure alarm sound.

The ECU 20 acquires a target steering angle θtgt for avoiding the departure from the reference line Lth from which the vehicle VA will depart (or for returning the vehicle VA to the inside of the reference line Lth from the reference line Lth from which the vehicle VA has departed). The ECU 20 controls the steering motor 30 such that a steering angle θ coincides with the target steering angle θtgt.

Operation

The ECU 20 determines whether a registered three-dimensional object RO previously registered in the ECU 20 exists, based on the image data. When the ECU 20 determines that the registered three-dimensional object RO exists, the ECU 20 sets an easing area EA (see FIG. 2 and FIG. 3) based on the position of the registered three-dimensional object RO on the image data. The ECU 20 is characterized by making it easier to recognize the border BL in the easing area EA on the image data than in a normal area other than the easing area EA. In other words, the ECU 20 is characterized by recognizing the border BL at an earlier timing in the easing area EA than in the normal area.

A process for recognizing the border BL will be described in detail.

The ECU 20 extracts feature points of a white line, a guardrail, a curbstone, a wall, and the like, from the image data. The ECU 20 performs fitting of feature points of respective kinds to "approximate lines expressed by multi-dimensional functions (for example, three-dimensional functions)", and thereby acquires, for each of the approximate lines, a vote value DV based on the number of feature points on the approximate line. The ECU 20 specifies approximate lines for each of which the vote value DV is equal to or more than a predetermined recognition threshold DVth, as border candidates, and the ECU 20 recognizes the border from the border candidates.

The ECU 20 recognizes the border BL in the normal area by using a normal recognition threshold DVnth as the recognition threshold DVth, and recognizes the border BL in the easing area EA by using "an easing recognition threshold DVeth that is set to a smaller value than the normal recognition threshold DVnth" as the recognition threshold DVth. Thereby, the border BL is more easily recognized in the easing area EA than in the normal area.

In the ECU 20, a three-dimensional object close to the border BL is registered as the registered three-dimensional object RO. As examples of the registered three-dimensional object RO, there are starting point three-dimensional objects SO shown in (A) to (D) of FIG. 4.

Figure 4:
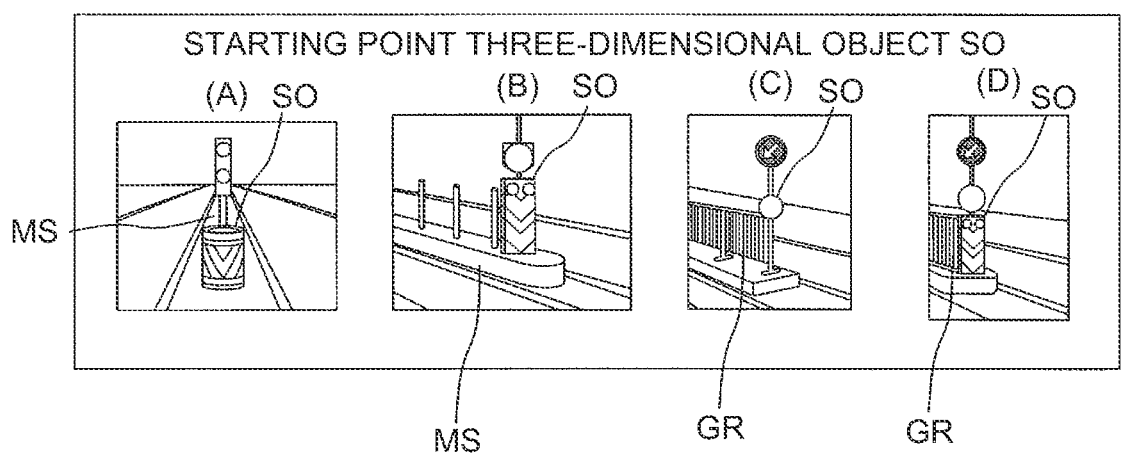
FIG. 4 is an explanatory diagram for exemplary starting point three-dimensional objects that are registered as registered three-dimensional objects.

As the starting point three-dimensional object SO, there are a three-dimensional object (see (A) and (B) of FIG. 4) that is a starting point (end portion) of a median strip MS, a three-dimensional object (see (C) and (D) of FIG. 4) that is a starting point (end portion) of a guardrail GR, and the like. In addition, there is a starting point (end portion) of a wall, as the starting point three-dimensional object SO.

Since the easing area EA is set based on the position of "the registered three-dimensional object RO close to the border BL" on the image data, it is possible to increase the recognition accuracy for the border BL. Even in a situation where it is hard to recognize the border BL close to the registered three-dimensional object RO, it is possible to increase the possibility that the ECU 20 can recognize the border BL, even when the vehicle VA does not get close to the border BL (even when the vehicle VA is away from the border BL). Thereby, even when the vehicle VA is away from the border BL, it is possible to determine whether the execution condition is satisfied, and to increase the possibility that at least one of the departure alarm and the departure control can be surely executed.

Figure 2:
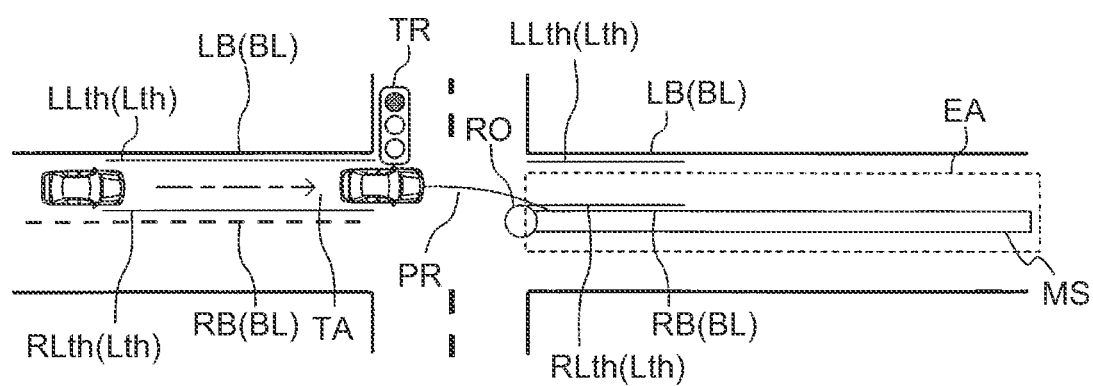
FIG. 2 is an explanatory diagram for the operation of the vehicle control device according to the embodiment of the present disclosure.
Figure 3:
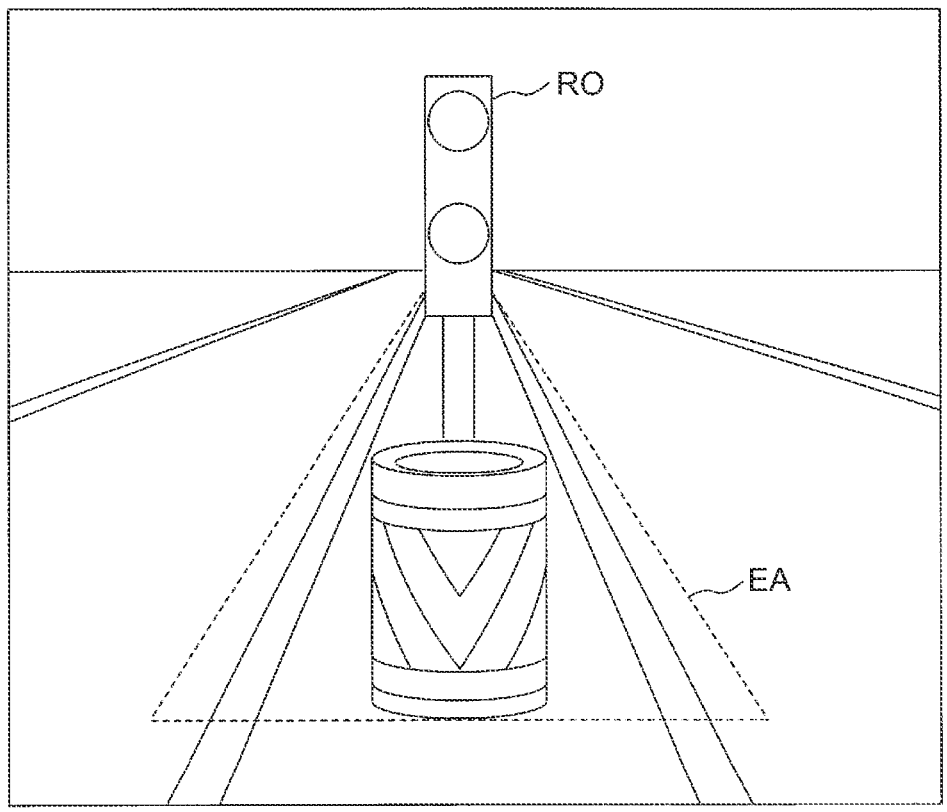
FIG. 3 is an explanatory diagram for an easing area that is set on image data.

In the example shown in FIG. 2, when the vehicle VA enters an intersection, the driver operates the steering wheel and changes the route of the vehicle VA rightward. Before the route of the vehicle VA is changed rightward, the ECU 20 has determined that the registered three-dimensional object RO exists, based on the image data, and has set the easing area EA on the image data. Therefore, the ECU 20 easily recognizes, as the border BL, the median strip MS behind the registered three-dimensional object RO in the back of the intersection. Thereby, at the time when the route of the vehicle VA is changed rightward, the ECU 20 can predict that the predicted route PR of the vehicle VA departs from the reference line Lth, and can execute at least one of the departure alarm and the departure control.

Specific Operation
Departure Control

Figure 5:
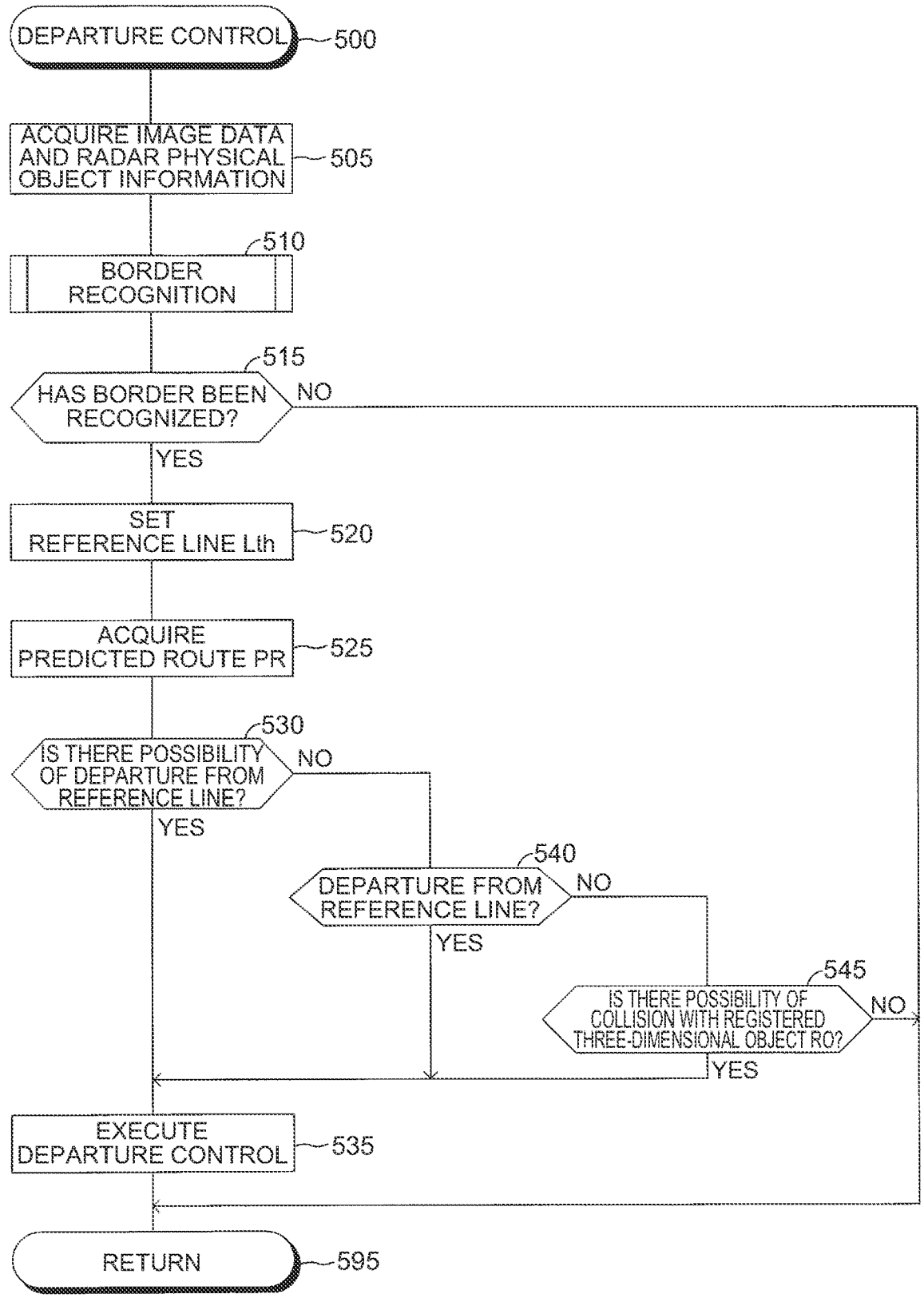
FIG. 5 is a flowchart of a routine that is executed by a CPU of the vehicle control device.

The CPU of the ECU 20 executes a routine shown by a flowchart in FIG. 5 whenever a predetermined time elapses.

At an appropriate timing, the CPU starts the process from step 500 in FIG. 5, and executes step 505 to step 515.

Step 505: The CPU acquires the image data from the forward camera 22, and acquires the radar physical object information from the millimeter wave radar 24.

Step 510: The CPU executes a border recognition subroutine for recognizing the border BL. The border recognition subroutine will be described later with use of FIG. 6.

Step 515: The CPU determines whether the border BL has been recognized in the border recognition subroutine. In detail, the CPU determines whether at least one of the right border RB and the left border LB has been recognized.

In the case where the border BL has not been recognized (in the case where none of the right border RB and the left border LB has been recognized), the CPU makes the determination of "No" in step 515, and proceeds to step 595 to end the routine once.

In the case where the border BL has been recognized (in the case where at least one of the right border RB and the left border LB has been recognized), the CPU makes the determination of "Yes" in step 515, and executes step 520 to step 530.

Step 520: The CPU sets the reference line Lth to a position that is a preset distance away from the border BL.

Step 525: The CPU acquires the predicted route PR of the vehicle VA based on the vehicle speed Vs and the yaw rate Yr.

Step 530: The CPU determines whether the predicted route PR crosses the reference line Lth, and thereby determines whether the vehicle VA is predicted to depart from the reference line Lth.

In the case where the predicted route PR crosses the reference line Lth, the CPU makes the determination of "Yes" in step 530, and proceeds to step 535. In step 535, the CPU executes the departure control. Thereafter, the CPU proceeds to step 595 to end the routine once.

In step 535, the CPU may execute the departure alarm instead of the departure control, or may execute the departure alarm and the departure control.

On the other hand, in the case where the predicted route PR does not cross the reference line Lth, the CPU makes the determination of "No" in step 530, and proceeds to step 540. In step 540, the CPU determines whether the vehicle VA has departed from the reference line Lth.

In the case where the vehicle VA has departed from the reference line Lth, the CPU makes the determination of "Yes" in step 540. The CPU executes the departure control in step 535, and proceeds to step 595 to end the routine once.

In the case where the vehicle VA has not departed from the reference line Lth, the CPU makes the determination of "No" in step 540, and proceeds to step 545. In step 545, the CPU determines whether there is a possibility that the vehicle VA collides with the registered three-dimensional object RO, based on the predicted route PR.

In the case where there is a possibility of the collision with the registered three-dimensional object RO, the CPU makes the determination of "Yes" in step 545. The CPU executes the departure control in step 535, and proceeds to step 595 to end the routine once.

In the case where there is no possibility of the collision with the registered three-dimensional object RO, the CPU makes the determination of "No" in step 545, and proceeds to step 595 to end the routine once.

Border Recognition Subroutine

Figure 6:
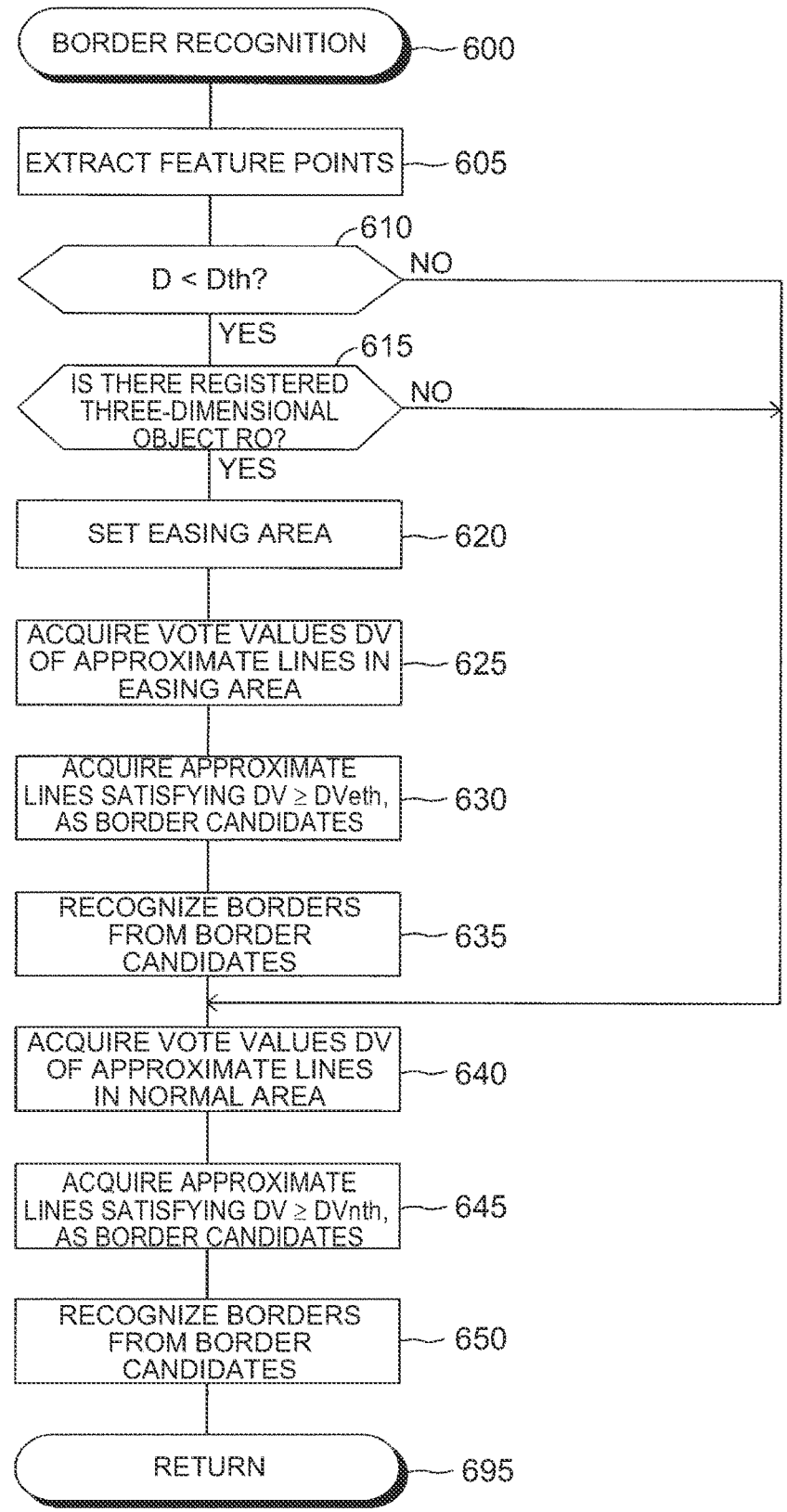
FIG. 6 is a flowchart of a subroutine that is executed by the CPU of the vehicle control device.

When the CPU proceeds to step 510 in FIG. 5, the CPU starts the process from step 600 in FIG. 6, and executes step 605 and step 610.

Step 605: The CPU extracts feature points of the respective kinds (a white line, a guardrail, a curbstone, and a wall) of the border BL, from the image data.

Step 610: The CPU specifies a traffic light distance D based on the image data, and determines whether the traffic light distance D is equal to or less than a threshold distance Dth (that is, whether the distance from the intersection to the vehicle VA is equal to or less than a threshold distance Dth).

In the case where the traffic light distance D is equal to or less than the threshold distance Dth, the CPU makes the determination of "Yes" in step 610, and proceeds to step 615. In step 615, the CPU specifies the positions of stationary physical objects based on the radar physical object information, and determines whether the registered three-dimensional object RO exists in the stationary physical objects on the image data.

In the case where the registered three-dimensional object RO exists, the CPU makes the determination of "Yes" in step 615, and executes step 620 to step 650.

Step 620: The CPU sets the easing area EA on the image data, based on the position of the image of the registered three-dimensional object RO on the image data. The easing area EA is set in an area behind the registered three-dimensional object RO (an area on the upper side of the image data), and the easing area EA may include the image of the registered three-dimensional object RO.

Step 625: The CPU acquires at least one approximate line based on the feature points in the easing area EA, and acquires the vote value DV by dividing the number of the feature points in the easing area EA by the number of the pixels in the easing area EA.

The CPU acquires the approximate line for each kind of feature points, and acquires the vote value DV for each kind of feature points.

Step 630: The CPU acquires approximate lines each of which the vote value DV is equal to or more than "the easing recognition threshold DVeth set to a smaller value than the normal recognition threshold DVnth", as border candidates.

Step 635: As the right border RB, the CPU recognizes a border candidate that has a reliability equal to or higher than a predetermined threshold and that has the highest reliability, from border candidates on the right side of the vehicle VA. As the left border LB, the CPU recognizes a border candidate that has a reliability equal to or higher than the threshold and that has the highest reliability, from border candidates on the left side of the vehicle VA.

For example, the CPU acquires the reliability from a standpoint 1 and standpoint 2 described below:

Standpoint 1: The reliability is higher as the lateral distance in the vehicle width direction between the approximate candidate and the vehicle VA is shorter.

Standpoint 2: The reliability is higher as the distance between an estimated position that is estimated based on the position of the last recognized border BL relative to the vehicle VA and the predicted route PR and the position of the approximate candidate is shorter.

In the case where there is no border candidate that has a reliability equal to or higher than the threshold, the CPU does not recognize the border.

Step 640: The CPU acquires at least one approximate line based on the feature points in the normal area, and acquires the vote value DV by dividing the number of the feature points in the normal area by the number of the pixels in the normal area.

Step 645: The CPU acquires approximate lines each of which the vote value DV is equal to or more than the normal recognition threshold DVnth, as border candidates.

Step 650: As the right border RB, the CPU recognizes a border candidate that has a reliability equal to or higher than a predetermined threshold and that has the highest reliability, from border candidates on the right side of the vehicle VA. As the left border LB, the CPU recognizes a border candidate that has a reliability equal to or higher than the threshold and that has the highest reliability, from border candidates on the left side of the vehicle VA. The method for acquiring the reliability is the same as that in step 635.

Thereafter, the CPU proceeds to step 695 to end the routine once.

On the other hand, in the case where the traffic light distance D is more than the threshold distance Dth or it is determined that no traffic light TR exists based on the image data when the CPU proceeds to step 610, the CPU makes the determination of "No" in step 610, and proceeds to step 640. In the case where no registered three-dimensional object RO exists when the CPU proceeds to step 615, the CPU makes the determination of "No" in step 615, and proceeds to step 640. In these cases, the whole area of the image data is set to the normal area.

With the embodiment, the border BL is more easily recognized in the easing area EA than in the normal area, and therefore, even in a situation where it is hard to recognize the border BL close to the registered three-dimensional object RO, the border BL can be recognized at an early timing. Thereby, it is possible to increase the possibility that the departure alarm or the departure control can be surely executed, and to reduce the possibility that the departure alarm and/or the departure control are executed late and the possibility that the departure alarm or the departure control is not executed.

Furthermore, the kind of the border BL is sometimes different between before and after the intersection (for example, the kind of the border BL is changed between before and after the intersection from the white line to the curbstone at the median strip MS). However, even in this case, with the embodiment, it is possible to increase the possibility that the borders BL before and after the intersection are recognized.

The starting point three-dimensional object SO registered as the registered three-dimensional object RO is often installed at the intersection. Therefore, in the case where the traffic light distance D is equal to or less than the threshold distance Dth ("Yes" in step 610), the ECU 20 determines whether the registered three-dimensional object RO exists, based on the image data (step 615). Thereby, it is possible to reduce the possibility that the easing area EA is mistakenly set and the border BL is mistakenly recognized.

There is a high possibility that the border BL such as the white line and the curbstone exists near an electric pole and a traffic sign. Therefore, the electric pole, the traffic sign, and the like may be registered as the registered three-dimensional object RO. In this case, the ECU 20 does not determine whether the traffic light distance D is equal to or less than the threshold distance Dth, and determines whether the registered three-dimensional object RO exists, based on the image data.

Furthermore, in the case where there is a possibility that the vehicle VA collides with the registered three-dimensional object RO in step 545 shown in FIG. 5, the ECU 20 determines that the execution condition is satisfied, and executes at least one of the departure alarm and the departure control. Thereby, it is possible to reduce the possibility that the vehicle VA collides with the registered three-dimensional object RO.

Modifications

The ECU 20 may change "the kind of the border BL to be easily recognized" depending on the kind of the registered three-dimensional object RO. Descriptions will be made below in detail.

(1) In the case where the kind of the registered three-dimensional object RO is "a three-dimensional object that is the starting point of the median strip MS" and "a three-dimensional object that is the starting point of the electric pole or the traffic sign", the ECU 20 sets the recognition threshold DVth for the white line or the curbstone in the easing area EA, to a smaller value than that in the normal area.

(2) In the case where the kind of the registered three-dimensional object RO is "a three-dimensional object that is the starting point of the guardrail GR", the ECU 20 sets the recognition threshold DVth for the white line and the guardrail in the easing area EA, to a smaller value than that in the normal area.

(3) In the case where the kind of the registered three-dimensional object RO is "a three-dimensional object that is the starting point of the wall", the ECU 20 sets the recognition threshold DVth for the white line, the wall and the side ditch in the easing area EA, to a smaller value than that in the normal area.

The kind of the border BL that is highly likely to exist near the registered three-dimensional object RO is different depending on the kind of the registered three-dimensional object RO, and therefore the ECU 20 is configured to change "the kind of the border BL to be easily recognized" depending on the kind of the registered three-dimensional object RO. Thereby, it is possible to further reduce the possibility that the border BL is mistakenly recognized.

In the case where the ECU 20 acquires the approximate line and acquires the vote value DV of the approximate line based on the feature points in the image data, the ECU 20 may set the weight of the feature point in the easing area EA to a larger value than the weight of the feature point in the normal area. Thereby, the border BL in the easing area EA is easily recognized.

Furthermore, the ECU 20 may set the reference line Lth such that the reference line Lth is at a position that is more distant from the border BL in the inward direction as the vehicle speed Vs is higher. Furthermore, the ECU 20 may set the reference line Lth at the same position as the border BL.

The vehicle control device 10 can be applied to vehicles such as an engine vehicle, a hybrid electric vehicle, a plug-in hybrid electric vehicle, a fuel cell electric vehicle, and a battery electric vehicle.

What is claimed is:

1. A vehicle control device comprising:
    a camera that photographs a forward view of a vehicle and that acquires image data; and
    a control unit that is configured to:
        extract feature points in the image data;
        perform fitting of the feature points to approximate lines expressed by multidimensional functions;
        acquire a vote value based on numbers of the feature points on each of the approximate lines;
        specify one or more of the approximate lines for each of which the vote value is equal to or more than a recognition threshold, as border candidates of a traveling area for the vehicle;
        recognize a border of the traveling area for the vehicle from the border candidates;
        determine, based on the image data, whether a starting point three-dimensional object provided at only a starting point of a median strip on the border exists;
        set an easing area based on a position of the starting point three-dimensional object on the image data and based on setting at least one of a first threshold, for the easing area as the recognition threshold which is smaller than a second threshold for a normal area, and a weight of the vote value in the easing area to a larger value than the weight of the vote value in the normal area, the starting point three-dimensional object exists in the normal area, and the normal area being an area that is on the image data and that is other than the easing area;
        determine whether the vehicle is predicted to depart from a reference line that is set based on at least one of the border and whether the vehicle has departed from the reference line; and
        perform at least one of a departure alarm and a departure control based on determining that the vehicle is predicted to depart from the reference line that is set based on the at least one of the border and whether the vehicle has departed from the reference line, the departure alarm indicating a departure of the vehicle from the reference line, the departure control comprising controlling the vehicle to avoid departing from the reference line.

2. The vehicle control device according to claim 1, wherein the control unit is configured to cause an execution condition to be satisfied and execute any of the departure alarm and the departure control, when there is a possibility that the vehicle collides with a registered three-dimensional object.

3. The vehicle control device according to claim 1, wherein the control unit is configured to select, based on the image data, a kind of the border from among kinds comprising a white line, a guardrail, a curbstone, and a wall.

4. The vehicle control device according to claim 1, further comprising
    a millimeter wave radar that sends a millimeter wave in a forward direction of the vehicle, receives a reflected wave from a physical object, and acquires radar physical object information based on the received reflected wave,
    wherein the control unit is configured to specify a position of stationary physical object based on the radar physical object information, and determine whether a registered three-dimensional object exists in the stationary physical objects on the image data.

5. The vehicle control device according to claim 2, further comprising
    a millimeter wave radar that sends a millimeter wave in a forward direction of the vehicle, receives a reflected wave from a physical object, and acquires radar physical object information based on the received reflected wave,
    wherein the control unit is configured to specify positions of stationary physical objects based on the radar physical object information, and determine whether the starting point three-dimensional object and the registered three-dimensional object exist in the stationary physical objects on the image data.

6. The vehicle control device according to claim 1, wherein the control unit is configured to perform the departure alarm, and the departure alarm comprises controlling a speaker of the vehicle to emit a sound.

7. The vehicle control device according to claim 1, wherein the control unit is configured to perform the departure control, and the departure control comprises controlling a steering motor of the vehicle to change a steering angle of the vehicle.

8. A vehicle control system comprising:
    a camera that photographs a forward view of a vehicle and that acquires image data;
    a millimeter wave radar that that sends a millimeter wave in a forward direction of the vehicle, receives a reflected wave from a physical object, and acquires radar physical object information based on the received reflected wave; and
    a control unit that is configured to:
        extract feature points in the image data, the feature points representing at least part of any of a white line, a guardrail, a curbstone, and a wall;
        perform fitting of the feature points to approximate lines expressed by multidimensional functions;
        acquire a vote value based on numbers of the feature points on each of the approximate lines and a number of pixels in at least part of the image data;
        specify one or more of the approximate lines for each of which the vote value is equal to or more than a recognition threshold, as border candidates of a traveling area for the vehicle;
        recognize a border of the traveling area for the vehicle from the border candidates and, based on recognizing the border, set a reference line to a preset distance away from at least part of the border, the border being at least one of a right border and a left border relative to the forward direction of the vehicle;

determine a distance from the vehicle to a traffic light;

determine, based on the image data and the distance from the vehicle to the traffic light, whether a starting point three-dimensional object provided at only a starting point of a median strip on the border exists;

specify a position of stationary physical object based on the radar physical object information, and determine whether a registered three-dimensional object exists in the stationary physical objects on the image data set an easing area based on a position of the starting point three-dimensional object on the image data and based on setting at least one of a first threshold, for the easing area as the recognition threshold which is smaller than a second threshold for a normal area, and a weight of the vote value in the easing area to a larger value than the weight of the vote value in the normal area, the starting point three-dimensional object exists in the normal area, and the normal area being an area that is on the image data and that is other than the easing area;

determine whether the vehicle is predicted to depart from a reference line that is set based on at least one of the border and whether the vehicle has departed from the reference line; and perform at least one of a departure alarm and a departure control based on determining that the vehicle is predicted to depart from the reference line that is set based on the at least one of the border and whether the vehicle has departed from the reference line, the departure alarm indicating a departure of the vehicle from the reference line, the departure control comprising controlling the vehicle to avoid departing from the reference line.

\* \* \* \* \*